United States Patent
Park et al.

(10) Patent No.: US 8,030,103 B2
(45) Date of Patent: Oct. 4, 2011

(54) LIQUID CRYSTAL DISPLAY PANEL AND METHOD OF MANUFACTURING THE SAME

(75) Inventors: Yong Han Park, Anyang-si (KR); Young Nam Yun, Gunpo-si (KR); Ji Hye Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/724,313

(22) Filed: Mar. 15, 2010

(65) Prior Publication Data

US 2010/0173433 A1    Jul. 8, 2010

Related U.S. Application Data

(62) Division of application No. 11/779,410, filed on Jul. 18, 2007, now Pat. No. 7,710,529.

(30) Foreign Application Priority Data

Jul. 19, 2006 (KR) .............................. 2006-0067499

(51) Int. Cl.
*H01L 21/00* (2006.01)
(52) U.S. Cl. ...... 438/27; 438/28; 438/149; 257/E33.053
(58) Field of Classification Search .................... 438/27, 438/28, 149
See application file for complete search history.

(56) References Cited

U.S. PATENT DOCUMENTS

| 6,151,092 A | 11/2000 | Fujimura et al. |
| 2003/0122978 A1 | 7/2003 | Lim |
| 2005/0140281 A1 | 6/2005 | Park |
| 2006/0145985 A1 | 7/2006 | Hwang et al. |
| 2007/0024794 A1 | 2/2007 | Kim |
| 2007/0109483 A1 | 5/2007 | Jeoung et al. |
| 2008/0018245 A1 | 1/2008 | Kim et al. |

FOREIGN PATENT DOCUMENTS

| JP | 2000-89242 | 3/2000 |
| KR | 2005-97516 | 8/2005 |
| KR | 2005-104869 | 11/2005 |

*Primary Examiner* — Alexander Ghyka
(74) *Attorney, Agent, or Firm* — Innovation Counsel LLP

(57) ABSTRACT

The present invention provides a liquid crystal display panel and a method of manufacturing the liquid crystal display panel capable of reducing or eliminating metal erosion in an area in which a conductive dot is formed. In some embodiments, a display panel comprises a common electrode formed on an upper substrate, a first electrode formed on a lower substrate opposing the upper substrate and configured to receive a common voltage, a conductive dot formed between the upper substrate and the lower substrate and positioned to supply the common electrode with the common voltage, an insulating layer having a contact hole exposing the first electrode, and a second electrode formed on the insulating layer to connect the conductive dot and the first electrode, wherein a cross sectional area of the conductive dot between the upper substrate and the lower substrate is greater than a cross sectional area of an opening of the contact hole.

8 Claims, 15 Drawing Sheets

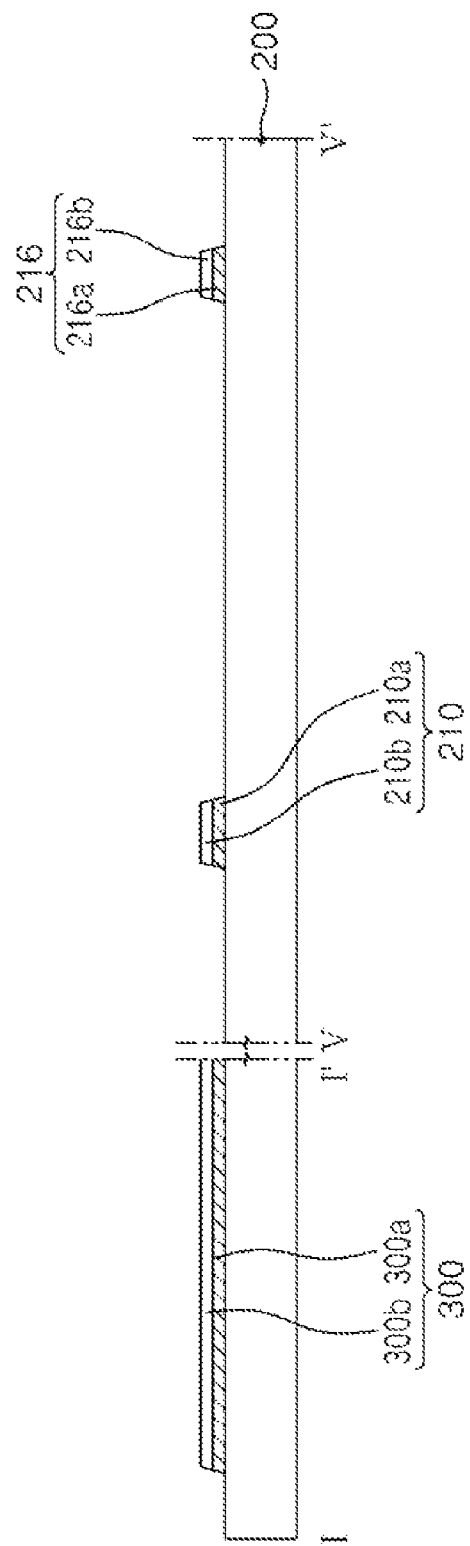

LIQUID CRYSTAL DISPLAY PANEL AND METHOD OF MANUFACTURING THE SAME

CROSS REFERENCE TO RELATED APPLICATIONS

This application is a divisional of U.S. patent application Ser. No. 11/779,410, filed on Jul. 18, 2007, which claims priority to Korean Patent Application No. 2006-67499 filed on Jul. 19, 2006 and all the benefits accruing therefrom under 35 U.S.C. §119, and the contents of which in their entirety are herein incorporated by reference.

BACKGROUND OF THE INVENTION

1. Field of the Invention

The present invention relates to a liquid crystal display ("LCD") panel and a method of manufacturing the LCD panel. More particularly, the present invention relates to an LCD panel and a method of manufacturing the LCD panel capable of reducing or preventing metal erosion due to crack generation by a conductive dot.

2. Description of the Related Art

Recently, CRTs (Cathode Ray Tubes) are most widely used as display devices. However, since CRTs have the difficulty in implementing slim, light products, alternative display types have been developed and used. These display types include flat panel displays ("FPDs") such as liquid crystal displays ("LCDs"), plasma display panels ("PDPs"), organic light emitting diodes ("OLED"), and other types of flat panel displays. Of these display types, LCDs, which have low power consumption, high resolution, and a large display area, are the most widely used.

LCDs display an image by adjusting light transmittance of a liquid crystal using an electric field. Generally, LCDs include a color filter substrate and a thin film transistor substrate opposing the color filter substrate, with the liquid crystal interposed therebetween.

The color filter substrate includes, as an upper substrate, a black matrix for preventing light leakage, color filters for implementing colors (usually red, green, and blue), and a common electrode for applying a common voltage to the liquid crystal.

The thin film transistor substrate includes, as a lower substrate, gate lines and data lines crossing the gate lines, thin film transistors each formed in pixel regions defined by adjacent crossing gate and data lines, and pixel electrodes connected to the thin film transistors. Additionally, a conductive dot for supplying the common electrode with a common voltage is formed between the thin film transistor substrate and the color filter substrate. A common voltage supplying pad which delivers the common voltage supplied from an external power source is formed on the thin film transistor substrate, as is a contact electrode portion connected to the common voltage supplying pad and the conductive dot.

The contact electrode portion is connected to the common voltage supplying pad, and includes a first contact electrode formed under an insulating layer and a second contact electrode connected to the first contact electrode through a contact hole that penetrates the insulating layer. The conductive dot is formed on the second contact electrode. In order to reduce contact resistances of the first contact electrode and the second contact electrode, the contact hole is formed to have an area greater than a cross-sectional area of the conductive dot.

Because of the pressure of the conductive dot, a crack may be generated on the second contact electrode. Moisture can then penetrate into the first contact electrode through the generated crack, thereby eroding the first contact electrode. In particular, if the first contact electrode is formed using aluminum or an aluminum alloy, etc. a serious erosion problem may occur.

BRIEF SUMMARY OF THE INVENTION

The present invention provides a liquid crystal display ("LCD") panel and a method of manufacturing the LCD panel capable of preventing (or reducing the occurrence and/or severity of) metal erosion in an area in which a conductive dot is formed.

In an exemplary embodiment of the present invention, a liquid crystal display panel includes a common electrode formed on an upper substrate; a first electrode formed on a lower substrate opposing the upper substrate to receive a common voltage; a conductive dot formed between the upper substrate and the lower substrate and positioned to supply the common electrode with the common voltage; an insulating layer having a contact hole exposing the first electrode; and a second electrode formed on the insulating layer to connect the conductive dot and the first electrode, wherein a cross sectional area of the conductive dot is greater than a cross sectional area of an opening of the contact hole.

The display panel may further comprise a second contact hole connecting the first electrode and the second electrode.

The display panel may further comprise a pixel electrode formed on the lower substrate and configured to generate an electric field in a region between the common electrode and the pixel electrode based on a potential difference between the pixel electrode and the common electrode; and a thin film transistor connected with the pixel electrode.

The display panel may further comprise a storage voltage supply line connected to the first electrode; and a storage electrode forking from the storage voltage supply line and formed to at least partially overlap the pixel electrode.

In some embodiments, the first electrode is formed of the same metal material as that of a gate electrode of the thin film transistor.

In some embodiments, the first electrode includes at least two layers.

In some embodiments, the first electrode may be formed of the same metal material as that of the source electrode and the drain electrode of the thin film transistor.

In some embodiments, second electrode is formed of the same material as that of a pixel electrode.

In some embodiments, a plurality of conductive dots are formed with plural number, and the display panel may further comprise a connection line connecting at least some of the conductive dots with one another.

In some embodiments, the conductive dot is formed of at least one of gold, silver, and alloy thereof.

In an exemplary embodiment of the present invention a method of manufacturing a liquid crystal display panel includes preparing a color filter substrate comprising a common electrode formed on an upper substrate; preparing a lower substrate opposing the upper substrate and comprising a first electrode, an insulating layer having a contact hole exposing the first electrode, a second electrode formed on the insulating layer and in the contact hole adjacent the first electrode to provide electrical communication with the first electrode, a pixel electrode configured to generate an electric field in the region between the common electrode and the pixel electrode based on a potential difference between the pixel electrode and the common electrode, and a thin film transistor connected to the pixel electrode; forming a conductive dot to overlap the contact hole between the common electrode and the second electrode and to overlap an area peripheral to an opening of the contact hole and in communication with the common electrode and the second electrode; and assembling the upper substrate and the lower substrate.

The method may further comprise forming a second contact hole in the insulating layer to connect the first electrode and the second electrode.

The preparing of the lower substrate may further include forming a storage voltage supply line connected to the first electrode and configured to supply a storage voltage; and forming a storage electrode extending from the storage line and positioned at least partially overlapping the pixel electrode.

In some embodiments, the first electrode is formed of the same metal material as the gate electrode of the thin film transistor.

In some embodiments, first electrode may be formed of two or more layers.

In some embodiments, the first electrode is formed of the same metal as the source electrode and the drain electrode of the thin film transistor.

In some embodiments, forming the conductive dot comprises forming a plurality of conductive dots including a first conductive dot and a second conductive dot, and wherein the method further comprises forming a connection line connecting the first and second conductive dots.

In some embodiments, the conductive dot is formed of at least one of gold, silver, or alloy thereof on the lower substrate.

BRIEF DESCRIPTION OF THE DRAWINGS

The above and other features and advantages of the present invention will become readily apparent by reference to the following detailed description when considered in conjunction with accompanying drawings, wherein:

FIGS. 4A to 8 are cross-sectional views showing a method of manufacturing a thin film transistor substrate with mask processes in accordance with an exemplary embodiment of the present invention;

DETAILED DESCRIPTION OF THE INVENTION

Exemplary embodiments of the present invention are described with reference to the accompanying drawings in detail. The same reference numbers will be used throughout the drawings to refer to the same or like parts. Detailed descriptions of well-known functions and structures incorporated herein may be omitted to avoid obscuring the subject matter of the present invention.

While the present invention is susceptible of embodiment in many different forms, there are shown in drawings and will be described herein in detail specific embodiments thereof, with the understanding that the present disclosure is to be considered as an exemplification of the principles of the invention and is not intended to limit the invention to the specific embodiments illustrated.

Figure 1:
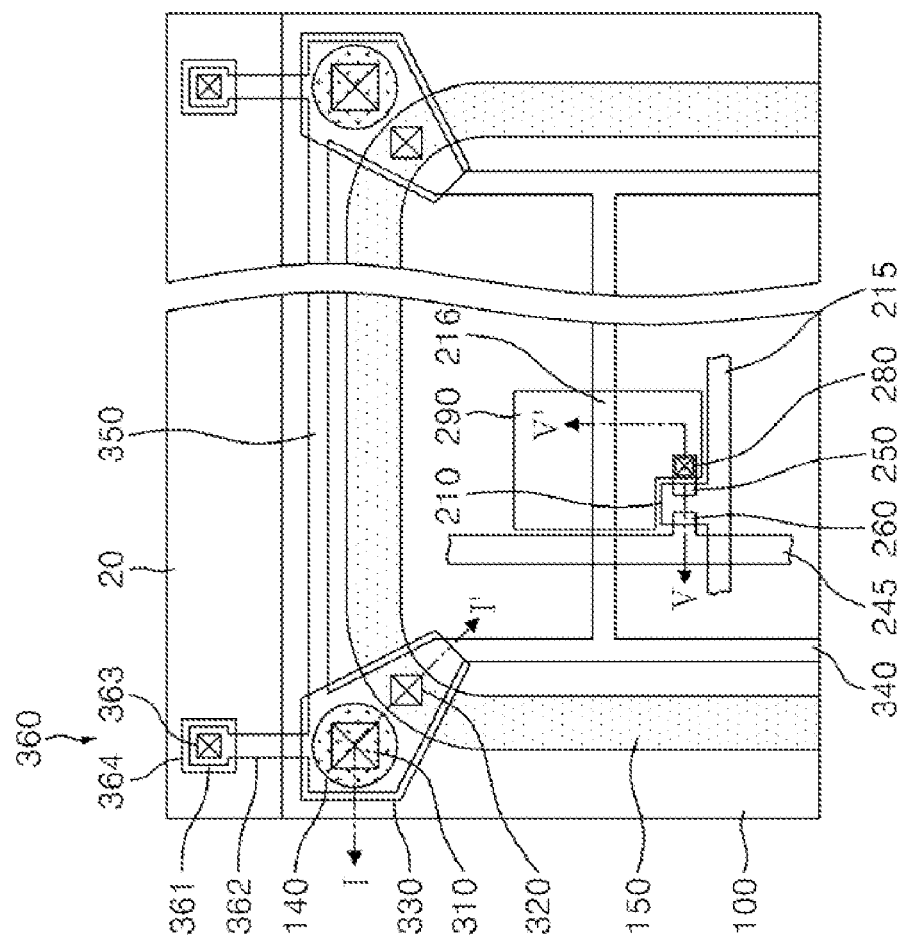
FIG. 1 is a plan view showing a liquid crystal display ("LCD") panel in accordance with an exemplary embodiment of the present invention.
Figure 2:
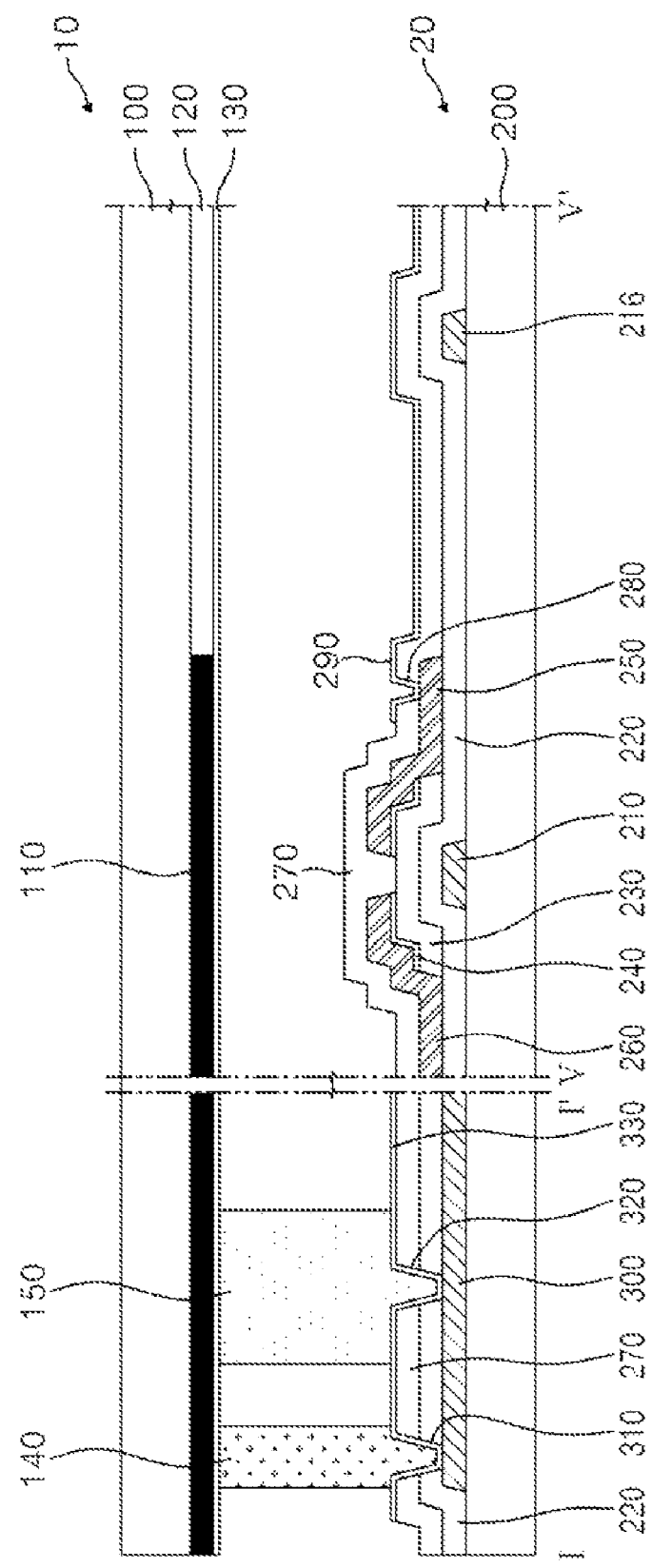
FIG. 2 is a cross-sectional view taken along lines I-I' and V-V' of FIG. 1 for showing the LCD panel in accordance with an exemplary embodiment of the present invention.

FIG. 1 is a plan view showing a liquid crystal display ("LCD") panel in accordance with an exemplary embodiment of the present invention, and FIG. 2 is a cross-sectional view taken along lines I-I' and V-V' of FIG. 1 for showing the LCD panel in accordance with a first embodiment of the present invention.

The LCD panel shown in FIGS. 1 and 2 comprises a thin film transistor substrate 20 and a color filter 10 substrate assembled by a sealant 150 with a liquid crystal interposed therebetween. The LCD panel according to an exemplary embodiment of the present invention includes a common electrode 130 formed on an upper substrate 100, a first electrode 300 formed on a lower substrate 200 opposing the upper substrate 100 to receive a common voltage Vcom, a conductive dot 140 formed between the upper substrate 100 and the lower substrate 200 to supply the common voltage Vcom to the common electrode 130, insulating layers 220, 270 having a first contact hole 310 exposing the first electrode 300, and a second electrode 330 formed on the insulating layers 220, 270 to connect the conductive dot 140 and the first electrode 300. The surface area of the first contact hole 310 is formed to be smaller than the surface area of the conductive dot 140.

More specifically, the color filter substrate 10 includes a black matrix 110 and a color filter 120 sequentially formed on the upper substrate 100, and the common electrode 130. The black matrix 110 is formed on the upper substrate 100 in a matrix to divide the upper substrate 100 into a plurality of cell areas in which the color filter 120 is formed, and to prevent light interference of adjacent cells and reflection of external light. The color filter 120 is formed as red, green and blue colors in the cell area divided by the black matrix 110 to transmit red, green, blue light, respectively. The common electrode 130 is a transparent conductive layer deposited on the whole surface of the color filter 120 and in operation supplies the common voltage Vcom, which is a reference value, through the conductive dot 140. Since the color filter 120 has stepped structure, the common electrode 130 formed on the color filter 120 also has stepped structure. An overcoat layer (not shown) may be formed between the color filter 120 and the common electrode 130 and improves the flatness the common electrode 130. Therefore the overcoat layer prevents the common electrode from having a stepped structure.

The thin film transistor substrate 20 includes the thin film transistor connected with a gate line 215 and a data line 245, a pixel electrode 290 connected to the thin film transistor, a common voltage supply line 362 supplying the common voltage Vcom from an external power source (not shown), the first electrode 300 connected with the common voltage supply line 362, and a second electrode 330 connected with the common electrode 130 through the conductive dot 140 and formed to overlap the first electrode 300. Thin film transistor substrate 20 further includes the first contact hole 310 formed to penetrate the insulating layers 220, 270 and exposing the first electrode 300, and the second electrode 330 is connected with the first electrode 300 through the first contact hole 310. The cross sectional area of the conductive dot 140 in the region between substrates 10 and 20 is greater than the cross sectional area of the first contact hole 310 at the opening of first contact hole 310.

The thin film transistor selectively supplies the pixel electrode 290 with a data signal from the data line 245 in response to a gate signal from the gate line 215. In order to do so, the thin film transistor includes a gate electrode 210 connected to the gate line 215, a source electrode 260 connected to the data line 245, and a drain electrode 250 connected to the pixel electrode 290. An active layer 230 overlaps the gate electrode 210 with the gate insulating layer 220 therebetween, and the active layer forms a channel between the source electrode 260 and the drain electrode 250. An ohmic contact layer 240 is provided for ohmic contact between the active layer 230 and the drain electrode 250 and the source electrode 260.

The pixel electrode 290 is connected to the drain electrode 250 exposed through a pixel contact hole 280 in each sub-pixel area. A potential difference between the pixel electrode 290 and the common electrode 130 receiving the common voltage Vcom generates a vertical electric field. The electric field drives liquid crystal molecules having dielectric birefringence that are aligned between the thin film transistor substrate 20 and the color filter substrate 10. Light transmittance varies according to the movement of the liquid crystal molecules within the pixel area, so that a gray scale can be implemented by varying the potential difference between the common electrode and the pixel electrode.

A plurality of metal pads which supply an electric signal from outside (for example, a power source signal including the common voltage Vcom, a control signal, an image signal, etc.) are formed on the thin film transistor substrate 20, but not overlapping the color filter substrate 10. Herein, the common voltage pad 360 supplies the common voltage Vcom and is connected to the first electrode 300. The common voltage pad 360 includes a first common pad electrode 361. First common pad electrode 361 may be formed of the same metal material as that of a gate metal, for example, the gate line 215, the gate electrode 210, etc. or of the same material as a data metal, for example, the data line 245, drain and source electrodes 250, 260, etc. The common voltage pad 360 further includes common voltage supply line 362 extending from the first common pad electrode 361 and connected with the first electrode 300, where the pad contact hole 363 is formed to penetrate the gate insulating layer 220 and a protective layer 270, and the second common pad electrode 364 directly connected to an external power source and connected with the first common pad electrode 361 through the pad contact hole 363. It is preferable that the second common pad electrode 364 is formed of the same conductive material as that of the pixel electrode 290.

As shown in FIG. 1, the first electrode 300 is connected through the common voltage supply line 362 and is formed in the non-display area of the thin film transistor substrate 20. The first electrode 300 is formed of the same metal material as that of the gate metal layer; for example, the gate line 215, the gate electrode 210, etc. Accordingly, the first electrode 300 is formed at the same metal layer during the process step in which the gate patterns of the gate line 215, the gate electrode 210, etc. are formed. The first electrode 300 may include Cr, Al, Cu, Mo, Ag, or an alloy thereof.

Figure 3:
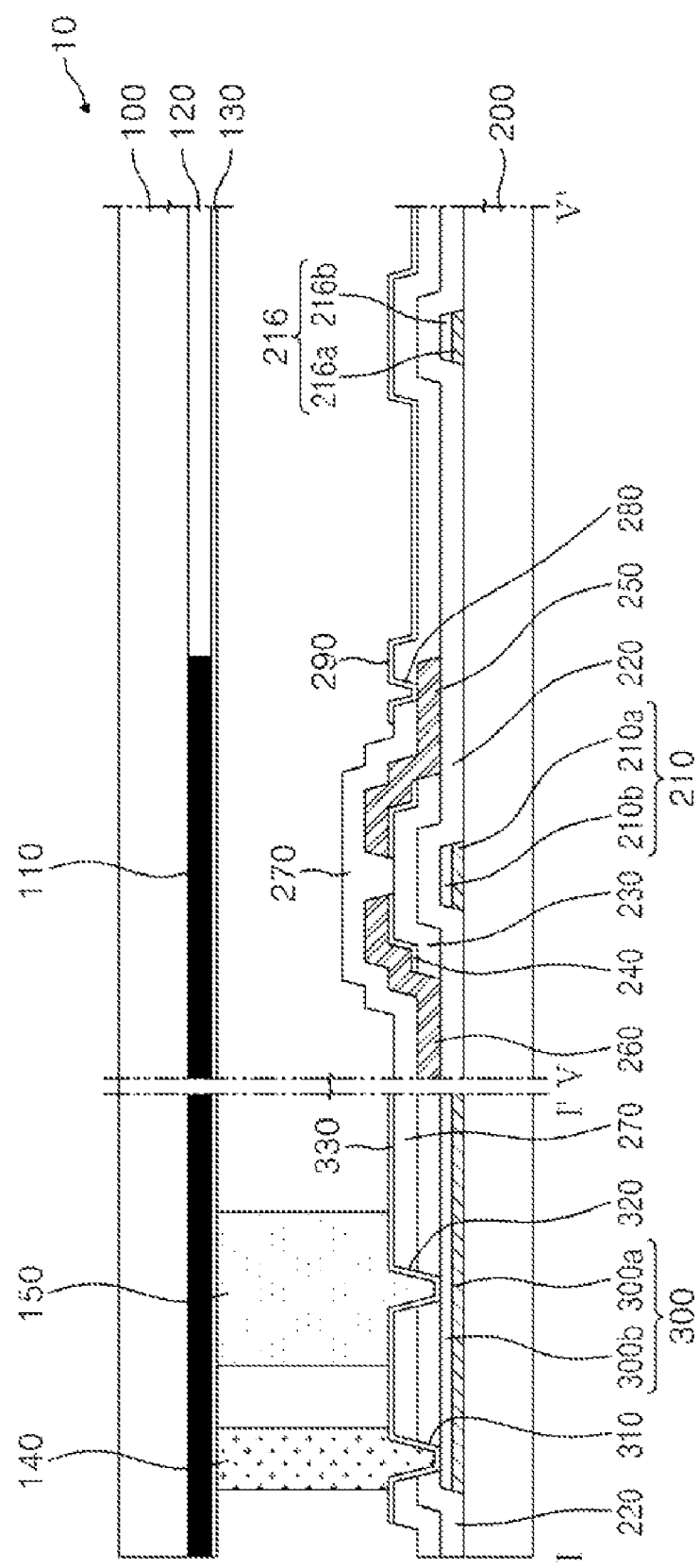
FIG. 3 is a cross-sectional view showing a cross section of a double-layered gate pattern in the LCD panel shown in FIG. 2.

Another embodiment is shown in FIG. 3. As shown in FIG. 3, the gate metal layer may be formed to reduce signal delay in signal transmission and to reduce voltage drop that occurs due to a resistance inside the metal layer. The gate metal layer of FIG. 3 is formed of more than a single layer. In the illustrated embodiment, the gate metal layer has a two layer gate electrode 210a and 210b, and a two layer storage electrode 216a and 216b to improve contact properties with the lower substrate 200 and the gate insulating layer 220. The first electrode 300 may be formed of at least two layers; for example, first electrode layers 300a and 300b like the gate metal layer. The first contact hole 310 penetrates the gate insulating layer 220 and the protective layer 270 to expose the first electrode 300. The first contact hole 310 is formed at a position corresponding to an area where the conductive dot 140 is formed. The first contact hole 310 exposes the first electrode 300. The cross sectional area of the conductive dot 140 in the region between substrates 10 and 20 is greater than the cross sectional area of the first contact hole 310 at the opening of first contact hole 310. Accordingly, the conductive dot 140 covers the first contact hole 310 and a peripheral area proximate the first contact hole 310 and blocks humidity that may penetrate from an outside the display panel. As a result, although the second electrode 330 gets damaged due to the conductive dot 140, penetration of humidity into the first electrode 300 is substantially reduced or eliminated, and thus erosion of the first electrode 300 may be prevented.

The second electrode 330 is connected with the first electrode 300 via the first contact hole 310 and formed to overlap the first electrode 300. The second electrode 330 may be formed of a conductive material, such as, for example, ITO (Indium Tin Oxide) or IZO (Indium Zinc Oxide), etc. which has a strong waterproof property. In other words, the second electrode 330 is preferably formed of the same conductive material as that of the pixel electrode 290.

The conductive dot 140 is an element including a conductive dot of silver (Ag) or gold (Au) in a sealant. The conductive dot 140 is formed between the second electrode 330 and the common electrode 130 to supply the common voltage Vcom applied from outside the display panel an external power source to the common electrode 130.

Meanwhile, as shown in FIG. 1, the second contact hole 320 is also formed to increase the contact area of the first electrode 300 and the second electrode 330 adjacent to the first contact hole 310. In other words, when the contact area of the first contact hole 310 is reduced, the contact resistance is increased. As a result, since a voltage drop due to contact resistance occurs when the common voltage Vcom is supplied to the common electrode 130, increasing the contact area of the first electrode 300 and the second electrode 330 via the second contact hole 320 and reducing the contact resistance reduces the voltage drop.

The common voltage Vcom is often used as a storage voltage Vst supplied to a storage electrode 216 of the LCD panel. In order to do so, the thin film transistor substrate 20 further includes a storage voltage supply line 340 connected with the first electrode 300, and the storage electrode 216 forks from the storage voltage supply line 340 (e.g., extends from storage voltage supply line 340 in a perpendicular direction, as shown in FIG. 1).

As shown in FIGS. 1 to 3, the storage voltage supply line 340 is formed of the same metal material as that of a gate metal layer including the gate line 215, the gate electrode 210, and the first electrode 300. The storage voltage supply line 340 is formed parallel to the data line 245 to supply the storage electrode 216 with the storage voltage Vst.

The storage electrode 216 forks from the storage voltage supply line 340 and is formed parallel to the gate line 215. The storage electrode 216 overlaps the pixel electrode 290 to form a storage capacitor. The storage electrode 216 is formed parallel to the gate line 215 or may be formed to overlap the pixel electrode 290 along the peripheral portion of the pixel electrode 290.

In some embodiments, an LCD panel according to an exemplary embodiment of the present invention may include a plurality of the conductive dots 140. For example, when the common voltage Vcom supplied to the common electrode 130 is supplied by a single conductive dot 140, a small voltage difference can occur between the common voltage Vcom of one end area of common electrode 130 where the common electrode 130 is connected to the conductive dot 140 and the common voltage Vcom of the other end area of the common electrode 130. In other words, a voltage drop may occur due to resistance of the common electrode 130 while the common voltage Vcom is supplied from one end to the other end. Further, even if the common voltage Vcom is used as the storage voltage, voltage drop of the common voltage Vcom supplied to the common electrode 130 may occur. Accordingly, a plurality of conductive dots 140 may be formed so that the common voltage Vcom supplied to the common electrode 130 has substantially the same voltage on the front surface of the common electrode 130.

As shown in FIG. 1, at least one conductive dot 140 is formed at a second corner of the non-display area of the thin film transistor substrate 20 in addition to the conductive dot 140 formed as described above (in a first corner of the non-display area of the thin film transistor substrate 20). The LCD panel further includes a connection line 350 connecting the conductive dots 140 with one another and extending between adjacent conductive dots 140. The connection line 350 is formed of the same metal material as that of the first electrode 300 and positioned between the first electrodes 300.

Referring to FIGS. 1, 4A to 8, a method of manufacturing a thin film transistor substrate according to an exemplary embodiment of the present invention will be now described with reference to a number of mask processes.

Figure 4A:
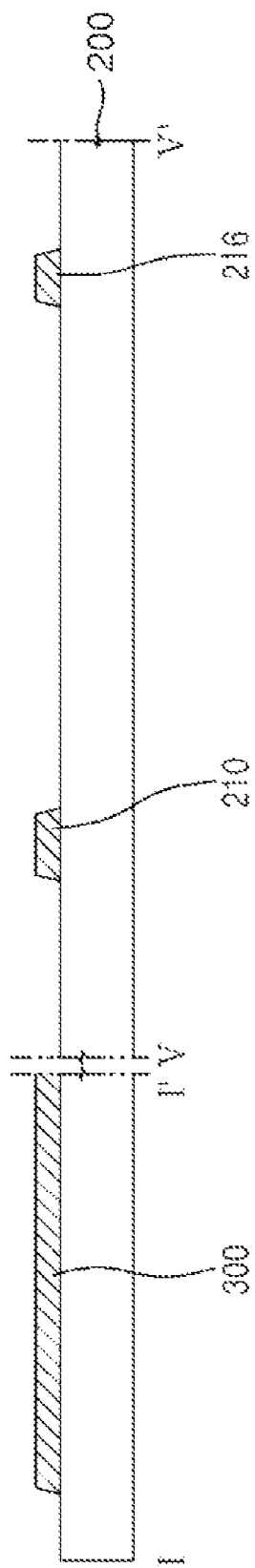

FIGS. 4A and 4B are cross-sectional views showing a first mask process in the method of manufacturing the thin film transistor substrate according to a first exemplary embodiment of the present invention.

Referring to FIG. 4A, gate patterns including the gate line 215, the gate electrode 210, the first electrode 300, the common voltage supply line 362, and the first common pad electrode 361 are formed on the lower substrate 200.

More specifically, a gate metal layer including a metal material such as Cr, Al, Mo, Ag, Cu, etc., or an alloy thereof is deposited on the lower substrate 200 by a sputtering or other method. Then, gate patterns including the gate line 215, the gate electrode 210, the first electrode 300, the common voltage supply line 362, and the first common pad electrode 361 are formed using a photolithography process. Additionally, the storage voltage supply line 340 connected with the first electrode 300 and the storage electrode 216 that forks from the storage voltage supply line 340 may be formed at this time. If a plurality of conductive dots is formed, the connection line 350 connecting the first electrodes 300 connected with the conductive dots may also be formed.

In some embodiments, as shown in FIG. 4b, the gate patterns may be formed as multi-layer structures; e.g., with a double layer structure. FIG. 4b shows a gate electrode with layers 210a and 210b, a two-layer storage electrode with layers 216a and 216b, and a two-layer first electrode with layers 300a and 300b. In other words, a double gate metal layer is deposited on the lower substrate 200 using a sputtering or other method, and then the gate pattern is formed by a photolithography process using the same mask to form the double-layered gate pattern.

Figure 5:
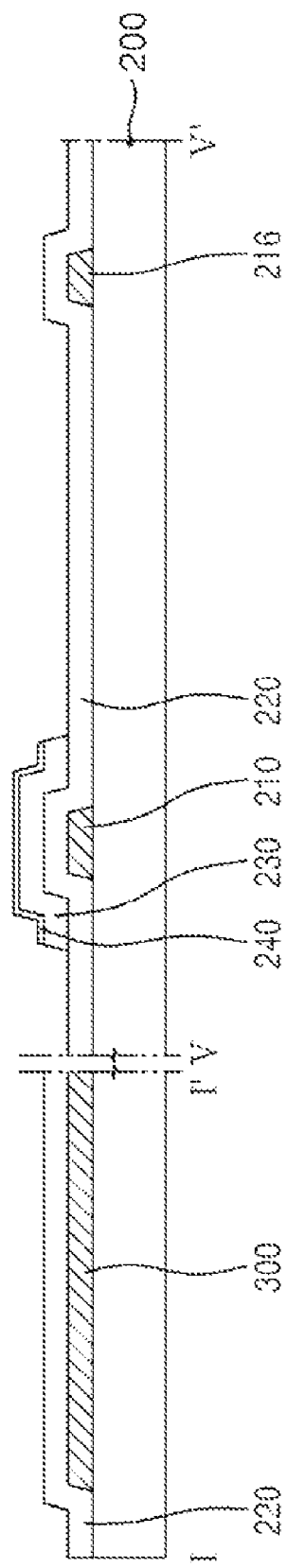

FIG. 5 is a cross-sectional view showing a second mask process in the method of manufacturing the thin film transistor substrate according to the first exemplary embodiment of the present invention.

Referring to FIG. 5, the gate insulating layer 220 covering the gate pattern is formed on the gate pattern. The gate insulating layer 220 comprises an inorganic material, such as, SiNx or SiOx, etc. After forming gate insulating layer 220, semiconductor patterns including the active layer 230 formed of an amorphous silicon and the ohmic contact layer 240 formed of an impurity doped amorphous silicon are formed on the gate insulating layer 220. The semiconductor patterns are formed by sequentially depositing material for the active layer 230 and the ohmic contact layer 240 and patterning the material by a photolithography process using a second mask.

Figure 6:
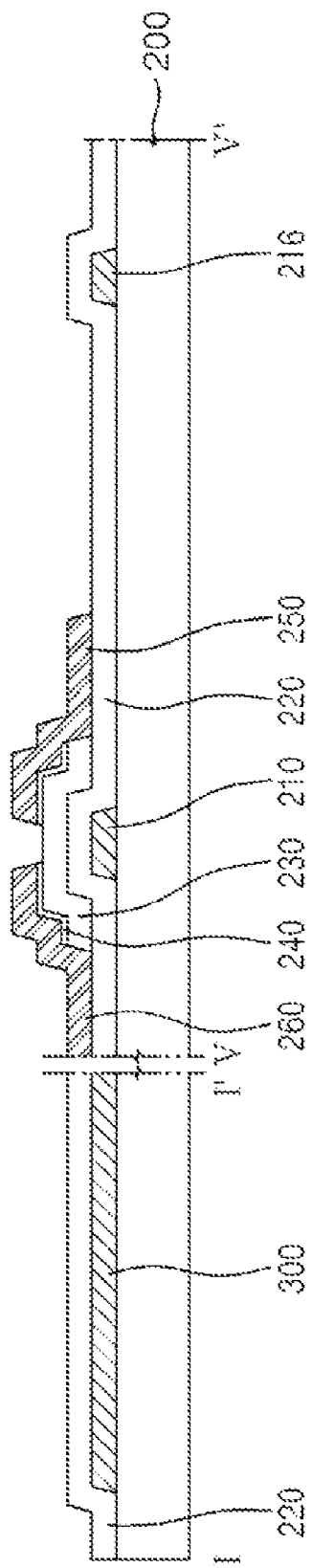

FIG. 6 is a cross-sectional view showing a third mask process in the method of manufacturing the thin film transistor substrate according to the first exemplary embodiment of the present invention.

Referring to FIG. 6, a data pattern including a data line 245 crossing a gate line 215, a source electrode 260 connected with the data line 245, and a drain electrode 250 facing the source electrode 260 is formed on a gate insulating layer 220 and on the semiconductor patterns. The data pattern is formed by depositing a data metal layer on the gate insulating layer 220 and the semiconductor patterns (including active layer 230 and ohmic contact layer 240) and patterning the data metal layer using a third mask by a photolithography process. The data metal layer may includes a metal, such as, Al, Mo, Cu, Cr, Ti, etc. or alloy thereof.

Then, the active layer 230 is exposed by removing the ohmic contact layer 240 between the source electrode 260 and the drain electrode 250.

Although the method of manufacturing the thin film transistor substrate according to the first exemplary embodiment of the present invention describes that the semiconductor patterns including layers 230 and 240 and the data patterns including elements 245, 250, and 260 are formed using a different mask, the semiconductor patterns (including elements 230, 240) and the data patterns (including elements 245, 250, and 260) may be formed using a same mask. The mask may be, for example, a slit mask partially patterning an aperture portion or a two-tone mask forming a different thickness in each area, etc.

Figure 7:
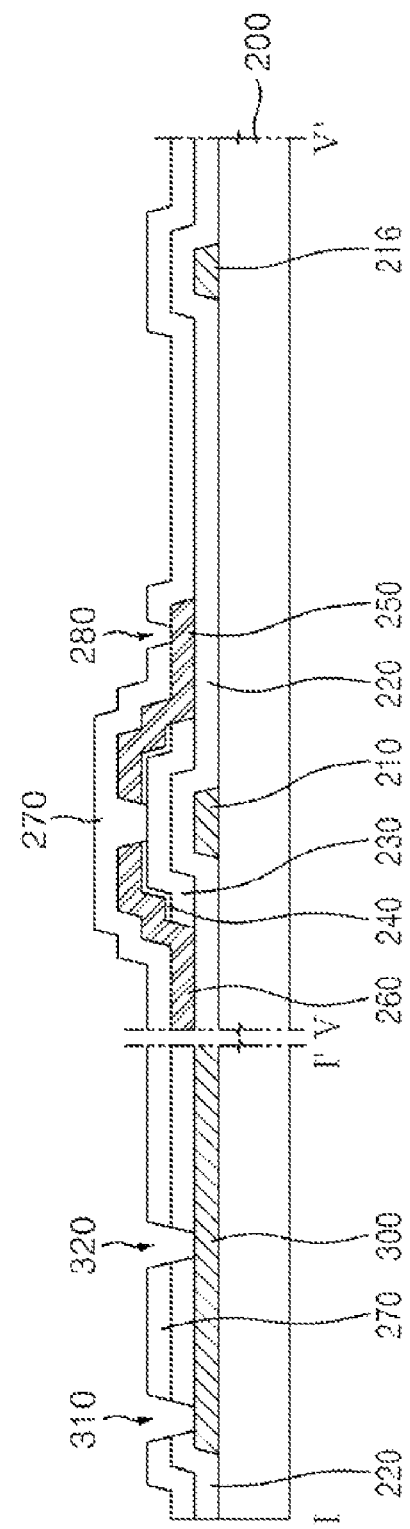

FIG. 7 is a cross-sectional view showing a fourth mask process in the method of manufacturing the thin film transistor substrate according to the first exemplary embodiment of the present invention.

Referring to FIG. 7, a protective layer 270 covering a data pattern is formed on a lower substrate 200 and patterned by a photolithography process using a fourth mask to form first and second contact holes 310 and 320 exposing parts of the first electrode 300, as well as a pixel contact hole 280 exposing a drain electrode 250. Herein, the first contact hole 310 is formed in an area where the conductive dot 140 will be formed, and the cross sectional area of the conductive dot 140 in the region between substrates 10 and 20 is greater than the cross sectional area of the first contact hole 310 at the opening of first contact hole 310. In some embodiments, the protective layer 270 is formed of the same inorganic insulating material as that of the gate insulating layer 220, while in some embodiments protective layer 270 may be formed of an organic insulating material.

Figure 8:
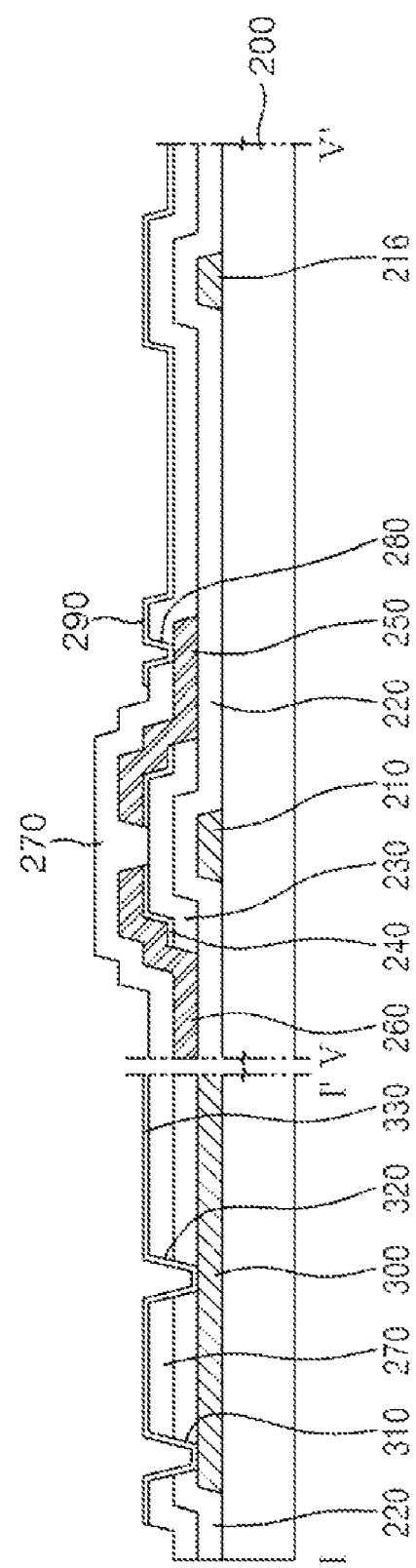

FIG. 8 is a cross-sectional view showing a fifth mask process in the method of manufacturing the thin film transistor substrate according to the first exemplary embodiment of the present invention.

Referring to FIG. 8, a transparent conductive pattern including a pixel electrode 290 connected to a drain electrode 250 via a pixel contact hole 280 and a second electrode 330 connected to the first electrode 300 via the first and second contact holes 310 and 320 is formed on a protective layer 270. The pixel electrode 290 and the second electrode 330 are formed by depositing transparent conductive material, such as ITO (Indium Tin Oxide) or IZO (Indium Zinc Oxide), etc.

on the protective layer 270 and patterning by a photolithography process using a fifth mask.

The conductive dot 140 is formed on the thin film transistor substrate 20 thus formed, and the thin film transistor substrate 20 and the color filter substrate 10 on which the common electrode 130 is formed are sealed by a sealant 150 to form the LCD panel. At this time, the conductive dot 140 supplies the common electrode 130 with the common voltage supplied from an external power source.

Meanwhile, the first electrode 300 may be formed of the same metal material as that of the data pattern elements such as the source electrode 260, the drain electrode 250, and the data line 245, etc.

Figure 9:
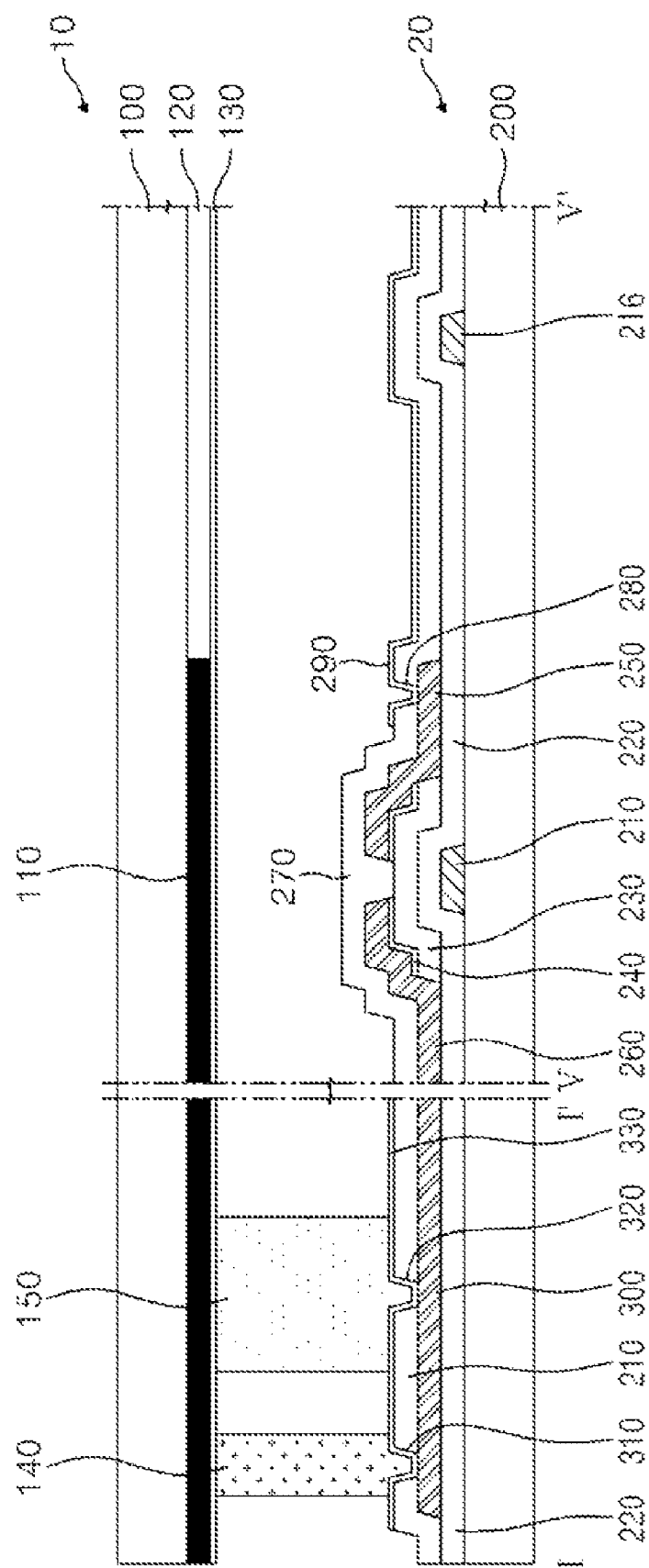
FIG. 9 is a cross-sectional view of the LCD panel in accordance with an exemplary embodiment of the present invention.

FIG. 9 is a cross-sectional view showing a cross section of the LCD panel according to a second exemplary embodiment of the present invention.

FIG. 9 shows the same configuration as that of FIG. 2, except that a first electrode 300 is formed of the data metal. Accordingly, detailed description of elements described above with reference to FIG. 2 may omitted.

Referring to FIGS. 1 and 9, the first electrode 300 is formed of the data metal. Accordingly, the LCD panel further includes a contact hole connecting the first electrode 300 with a common voltage supply line 362 formed of a gate metal and a storage voltage supply line 340.

Meanwhile, when one or more conductive dots 140 and the connection lines connecting the conductive dots 140 are formed, a contact hole to connect the first electrode 300 and the connection line 350 is also formed. Further, the connection line 350 may be formed of the same metal material as that of the first electrode 300.

In some embodiments, the storage voltage supply line 340, the common voltage supply line 362, and the connection line 350 may be formed of the data metal layer. FIGS. 10 to 14 are cross-sectional views showing the method of manufacturing the thin film transistor substrate according to the second exemplary embodiment of the present invention. FIGS. 10 to 14 show the same processes as those of FIGS. 4 to 8 except that the first electrode 300 is formed of the data pattern. Accordingly, detailed description of processes described above may be omitted. The following description refers to FIGS. 1 and 10 to 14.

Figure 10:
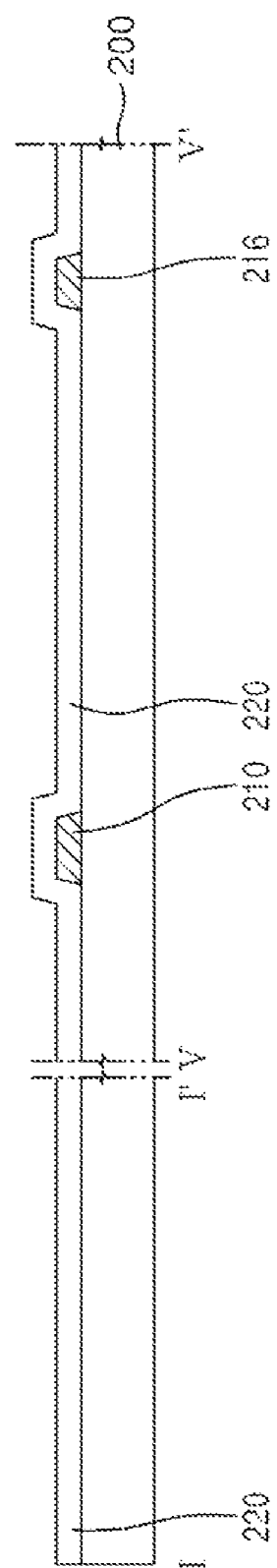
FIGS. 10 to 14 are cross-sectional views showing a method of manufacturing the thin film transistor substrate with mask processes in accordance with an exemplary embodiment of the present invention.

FIG. 10 is a cross-sectional view showing a first mask process in the method of manufacturing the thin film transistor substrate according to the second exemplary embodiment of the present invention.

Referring to FIG. 10, a gate pattern including a gate line 215, a gate electrode 210, a common voltage supply line 362, a first common pad electrode 361, a storage voltage supply line 340, and a storage electrode 216, is formed on a lower substrate 200.

More specifically, a gate metal layer including a metal material such as Cr, Al, Mo, Ag, Cu, etc. or alloy thereof is deposited on the lower substrate 200 using a sputtering or other appropriate method. Then, a gate pattern including the gate line 215, the gate electrode 210, the common voltage supply line 362, the first common pad electrode 361, the storage voltage supply line 340, and the forked storage electrode 216, is formed using a photolithography process. In embodiments in which a plurality of the conductive dots is formed, a connection line 350 connecting conductive dots 140 to one another may also be formed.

Figure 11:
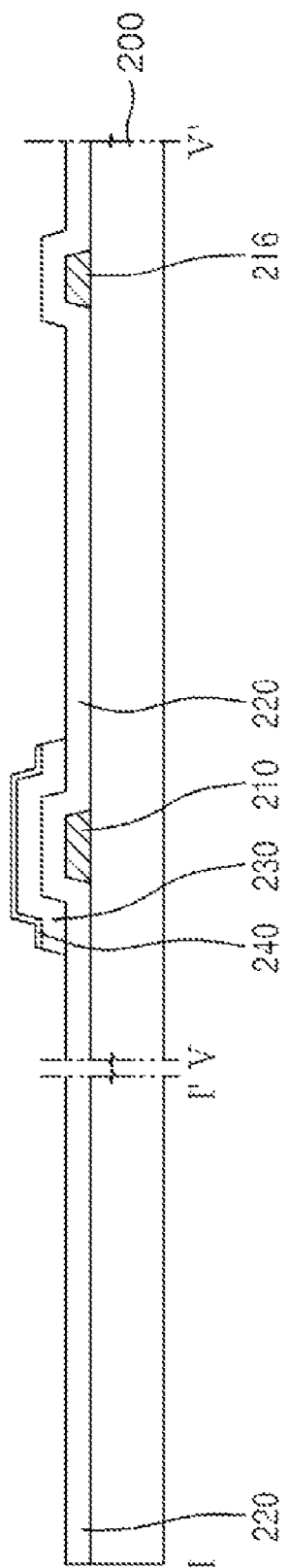

FIG. 11 is a cross-sectional view showing a second mask process in the method of manufacturing the thin film transistor substrate according to the second exemplary embodiment of the present invention.

Referring to FIG. 11, a gate insulating layer 220 covering the gate pattern, the active layer 230 formed on the gate insulating layer 220 of amorphous silicon, and the ohmic contact layer 240 formed of impurity doped amorphous silicon are deposited and then patterned by a photolithography process using a second mask to form semiconductor patterns including layers 230 and 240.

Figure 12:
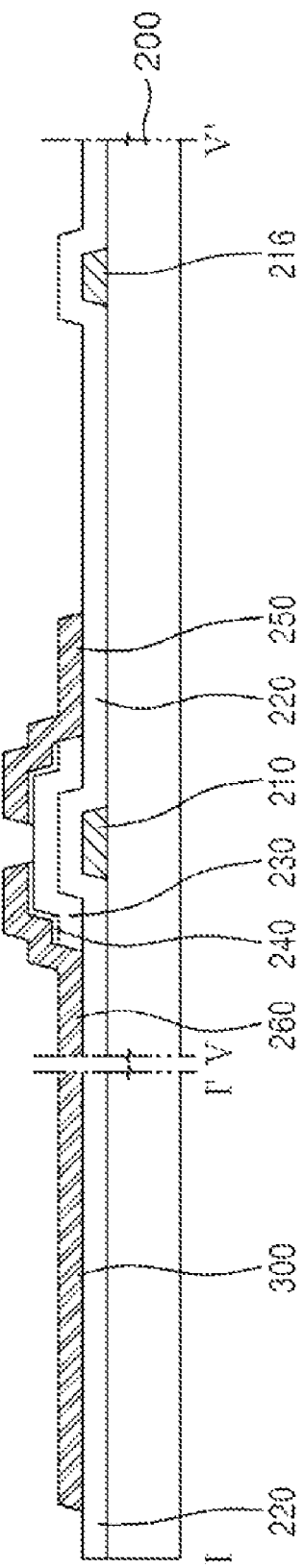

FIG. 12 is a cross-sectional view showing a third mask process in the method of manufacturing the thin film transistor substrate according to the second exemplary embodiment of the present invention.

Referring to FIG. 12, a data pattern including the data line 245 crossing the gate line 215, a source electrode 260 connected to the data line 245, and a drain electrode 250, as well as a first electrode 300 facing the source electrode 260 are formed on the gate insulating layer 220 and the semiconductor patterns including layers 230 and 240. The first common pad electrode 361 of the common voltage pad 360 to be connected to an external power source is formed of the data metal layer, not the gate metal layer, and thus may be connected to the first electrode 300. If a plurality of conductive dots 140 is formed, the connection line 350 connecting conductive dots 140 to one another may also be formed of the data metal layer. The data pattern is formed by depositing the data metal layer and then patterning the data metal layer using a photolithography process. In some embodiments, the data metal layer may include a metal, for example, Al, Mo, Cu, Cr, Ti, etc. or alloy thereof. The active layer 230 is exposed by removing a portion of the ohmic contact layer 240 between the source electrode 260 and the drain electrode 250.

In some embodiments, the semiconductor pattern and the data pattern may be simultaneously formed by depositing a gate insulation layer, an active layer, an impurity doped ohmic contact layer, and a data metal layer. The deposited layers may then be patterned by the photolithography process using one mask.

Figure 13:
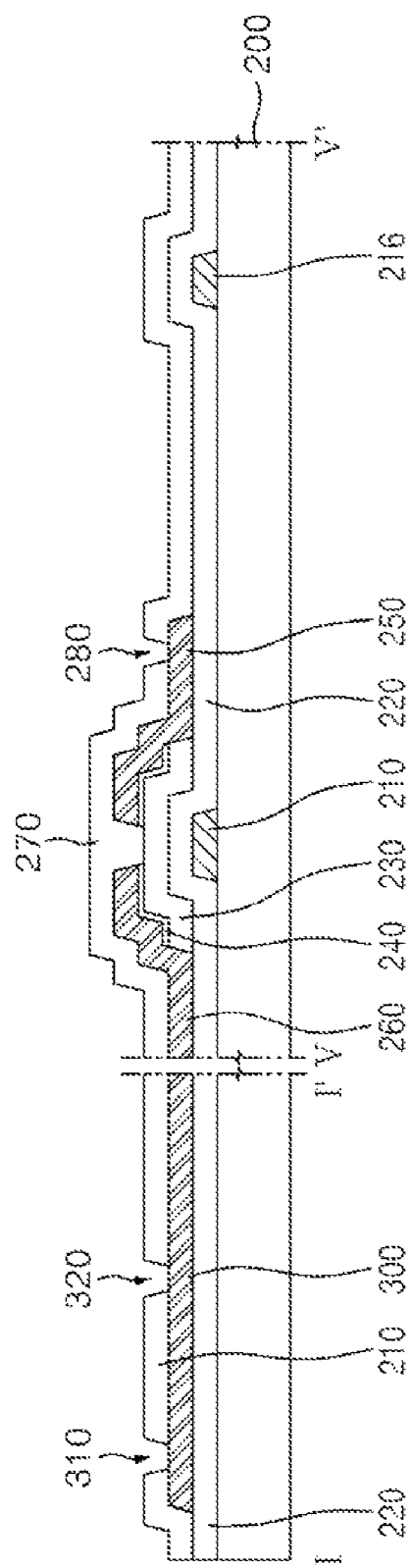

FIG. 13 is a cross-sectional view showing a fourth mask process in the method of manufacturing the thin film transistor substrate according to the second exemplary embodiment of the present invention.

Referring to FIG. 13, the protective layer 270 covering the data pattern is formed on the lower substrate 200 and then patterned to form the first and second contact holes 310, 320 exposing the first electrode 300, the pixel contact hole 280 exposing the drain electrode 250, and a further contact hole exposing part of the first electrode 300 connecting the first electrode 300 and the storage voltage supply line 340. Herein, the first contact hole 310 is formed in an area where the conductive dot will be formed, and the cross sectional area of the conductive dot 140 in the region between substrates 10 and 20 is greater than the cross sectional area of the first contact hole 310 at the opening of first contact hole 310. The protective layer 270 may be formed of the same inorganic insulating material as that of the gate insulating layer 220, or may be formed of an organic insulating material.

Figure 14:
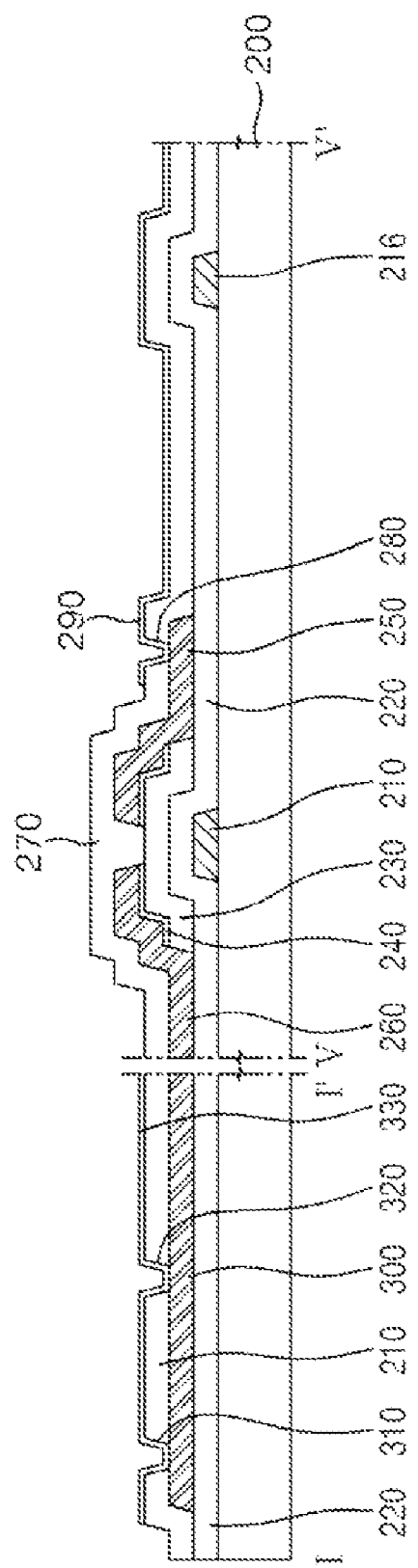

FIG. 14 is a cross-sectional view showing a fifth mask process in the method of manufacturing the thin film transistor substrate according to the second exemplary embodiment of the present invention.

Referring to FIG. 14, a transparent conductive pattern, including the pixel electrode 290 connected to the drain electrode 250 via the pixel contact hole 280 and the second electrode 330 connected to the first electrode 300 via the first and second contact holes 310, 320 is formed on the protective layer 270. The pixel electrode 290 and the second electrode 330 are formed by depositing transparent conductive material such as ITO (Indium Tin Oxide), IZO (Indium Zinc Oxide), or other appropriate material on the protective layer 270 and then patterning using a photolithography process.

As described above, according to the LCD panel and the method of manufacturing the same according to the present invention, in the area in which the conductive dot formed between the color filter substrate and the thin film transistor substrate supplying the common voltage is formed, the cross sectional area of the conductive dot is greater than the cross sectional area of the opening of the first contact hole. The conductive dot is formed to cover the contact holes and an area adjacent the periphery of the contact holes. As a result, erosion of the electrode due to the penetration of humidity may be prevented.

Further, a contact hole reducing the contact resistance between electrodes is also formed, thereby preventing an increase of the contact resistance between the electrodes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a liquid crystal display panel, the method comprising:
    preparing a color filter substrate comprising a common electrode formed on an upper substrate;
    preparing a lower substrate opposing the upper substrate and comprising a first electrode, an insulating layer having a contact hole exposing the first electrode, a second electrode formed on the insulating layer and in the contact hole adjacent the first electrode to provide electrical communication with the first electrode, a pixel electrode configured to generate an electric field in the region between the common electrode and the pixel electrode based on a potential difference between the pixel electrode and the common electrode, and a thin film transistor connected to the pixel electrode;
    forming a conductive dot to fill the contact hole and overlap an area peripheral to an opening of the contact hole, the conductive dot being in electrical communication with the common electrode and the second electrode; and
    assembling the upper substrate and the lower substrate.

2. The method of claim 1, further comprising forming a second contact hole in the insulating layer to expose the first electrode, and wherein the second electrode is connected to the first electrode at a bottom portion of the second contact hole.

3. The method of claim 2, wherein the preparing of the lower substrate comprises:
    forming a storage voltage supply line connected to the first electrode and configured to supply a storage voltage; and
    forming a storage electrode extending from the storage line and positioned at least partially overlapping the pixel electrode.

4. The method of claim 3, wherein the thin film transistor comprises a gate electrode formed of a first metal material, and wherein the first electrode is formed of the first metal material.

5. The method of claim 4, wherein the first electrode comprises a layer formed of the first metal material and comprises at least one additional layer comprising a material different than the first metal material.

6. The method of claim 1, wherein the thin film transistor comprises a source electrode and a drain electrode formed of a particular metal material, and wherein the first electrode is formed of the particular metal material.

7. The method of claim 1, wherein forming a conductive dot comprises forming a plurality of conductive dots including a first conductive dot and a second conductive dot, and wherein the method further comprises forming a connection line connecting the first and second conductive dots.

8. The method of claim 1, wherein forming the conductive dot comprises forming the conductive dot using at least one material selected from the group consisting of at gold, silver, a gold alloy, and a silver alloy.

* * * * *